Patented Feb. 10, 1931

1,792,163

UNITED STATES PATENT OFFICE

FRANZ HENLE, OF HOCHST-ON-THE-MAIN, GERMANY, ASSIGNOR TO I. G. FARBENINDUSTRIE AKTIENGESELLSCHAFT, OF FRANKFORT-ON-THE-MAIN, GERMANY

PROCESS OF PREPARING CARBOXYLIC-ACID CHLORIDES

No Drawing. Application filed June 29, 1923, Serial No. 648,577, and in Germany July 6, 1922.

In U. S. Patent No. 752,947 a process is described for the production of chlorides and anhydrides of organic carboxylic acids which consists in treating the respective carboxylic acids or their salts with salts of chlorosulphonic acid. As set forth in Examples 3 and 6 of said patent the acetylchloride and benzoylchloride are obtained from the respective free carboxylic acid by treating them with sodium chlorosulphonate. However, as experiment shows, the yield, which is not stated by figures, is totally unsatisfactory when free carboxylic acid is used instead of carboxylic acid salts; moreover the operation of stirring the tough mass of the reaction offers considerable difficulties. Therefore in the process in question free carboxylic acids have not been used in practice for the preparation of acetylchloride or acetic anhydride, although it would be more economical to avoid the intermedium of the sodium salt since there is primarily prepared free acetic acid and from it sodium acetate.

Now I have found that it is possible to improve considerably the process described in Patent No. 752,947 for the preparation of organic acid chlorides from the free acids by a treatment with a sulfochloride body, by which expression is meant sodium-chlorosulfonate and arylsulfochlorides and thereby to arrive at almost quantitative yields of carboxylic acid chlorides. This improvement consists in adding to the reaction mixture alkali metal chlorides or any other suitable inorganic salts or chemically indifferent diluents and in using a higher proportion of the sulfochloride body to the free organic acid than is indicated in the said patent.

In deed, the quantity of sodium chlorosulphonate stated in the examples in the patent is not sufficient for the complete conversion of the free acid, because with free acids the reaction proceeds in a different manner than with the alkali metal salts, namely unlike the equation given in the patent.

therefore

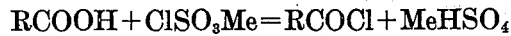

but according to the equation:

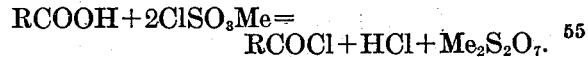

As the researches prove there is not obtained,—for instance by using free acetic acid,—alkali metal bisulphate as a residue as was to be expected in analogy with the sodium acetate reaction but alkali metal pyrosulphate and hydrogen chloride, while the excess of acetic acid from which the sodium chlorosulphonic is withdrawn in consequence of the formation of pyrosulphate and hydrogen chloride remains unchanged. Therefore 2 moles of the chlorosulphonate are required for the conversion of 1 mole of acetic acid into acetylchloride; thus it is necessary to use double the quantity of the chlorosulphonate shown in the equation of the reaction given in the said patent which is only applicable to the carboxylic acid salts.

It is advantageous in securing an easy progress of the reaction, to add an alkali metal chloride or any other suitable inorganic salt, such as a neutral sulphate, pyrosulphate or the like, or dry, pulverized, chemically indifferent diluents such as kaolin, sand etc., as such additions render the reaction mixture very much more easily stirred than is the chlorosulphonate alone which has a great tendency to sinter and to form lumps and therefore requires, when mixed with glacial acetic acid instead of sodium acetate, an exceedingly strong stirring apparatus; however, not only a reliable working of the process but also the yield of acetylchloride depends in the first place on the easy and intimate mixing.

Moreover the addition of an alkali metal chloride renders innocuous, by the formation of a salt, the residues of free acid which contaminate the sodium chlorosulphonate and have a destroying action on the organic acid.

Finally it seems that an alkali metal chloride has the property of promoting the reaction by the formation of intermediate products, as will be seen from the following statements:

It has moreover been found, that arylsulphochlorides which do not react with carboxylic acids alone, immediately enter into reaction on addition of an alkali metal chloride with the formation of carboxylic acid chloride, hydrogen chloride and arylsulphonic acid anhydride. For the production of acetylchloride for instance by means of arylsulphochlorides there may be used,—a fact which was hitherto unknown,—free acetic acid plus common salt with a result similar to that when sodium acetate is used, which, according to German Patent No. 123,052 yields, when combined with arylsulphochlorides, acetylchloride or acetic anhydride. However there is a difference. In the reaction between arylsulphochlorides and carboxylic acids as in the reaction between sodium chlorosulphonate and free acetic acid, 2 moles of the sulphochloride body are required to convert one mole of the acid to the acid chloride since hydrogen chloride is formed in both instances, whereas sodium acetate reacts with 1 mole of arylsulphochloride to form acetyl chloride and arylsulphonate.

In German Patent No. 123,052 the reaction proceeds according to the equation:

$$C_6H_5-SO_2Cl + CH_3COONa = CH_3COCl + C_6H_5-SO_3Na$$

and in the present application according to the following equation:

$$2C_6H_5-SO_2Cl + CH_3COOH = CH_3COCl + C_6H_5SO_2.O.SO_2C_6H_5 + NaCl.$$

As the last reaction does not take place at all without the addition of sodium chloride there must be ascribed to the alkali metal chloride not only a mechanical but also a chemical action. Probably from primarily formed free arylsulphonic acid and sodium chloride, hydrogen chloride and arylsulphonate is obtained as an intermediate product, which latter forms arylsulphonic anhyride with a second molecule of the sulfochloride body while regenerating sodium chloride. Therefore the alkali metal chloride is not required in stoichiometric proportion, much smaller quantities being sufficient. Besides alkali metal chlorides the other above mentioned agents may be used as diluents.

However if one works with sodium chlorosulphonate and free carboxylic acid, the mechanical action of the additions as extender predominates. In this case it is advantageous to start with a mixture of sodium chlorosulphonate and sodium chloride in equimolecular proportions, particularly since such a mixture can be prepared more advantageously than a product free from sodium chloride (more easily carried out and the reaction is more quickly terminated). After the formation of the carboxylic acid chloride is finished, the residue contains pyrosulphate and alkali metal chloride in such proportion that it can be converted in the simplest manner into neutral sulphate, namely by adding water or by a treatment with steam and by heating the resulting mixture of bisulphate and alkali metal chloride until the evolution of the hydrogen chloride is finished.

The arylsulphonic acid anhydride resulting from arylsulphochlorides can be converted by saponification into arylsulphonic acid or arylsulphonates and thus utilized as starting material for dyestuffs.

*Examples*

1. In a stirring vessel, made of iron or copper and provided with a fractionating column, an intimate mixture of 277 parts by weight of sodium chlorosulphonate (2 moles) and 117 parts by weight of sodium chloride (2 moles) is pre-heated to 60°–70° C. and there is gradually added thereto within 2–3 hours, while continually stirring, 60 parts by weight of glacial acetic acid (1 mole) accordingly as the reaction proceeds. The acetyl chloride immediately distills over. The thermometer at the outlet pipe indicates about 30°—40° C. as the escaping hydrogen chloride reduces the temperature. The acetyl chloride is condensed by subjecting it to progressively lower temperatures in several coolers arranged in series, for example, the first condenser in the series may be cooled by water, the second by a liquid freezing mixture, and the third by carbon dioxide, air or any other suitable refrigerating agent capable of giving a temperature below $-30°$ C., and the product is collected in cooled receivers. The hydrogen chloride is freed from the last traces of acetylchloride and entrained glacial acetic acid by washing with solvents in washing bottles or trickling towers and collected in the usual manner in water. When no more acetyl-chloride escapes a small residue of unused glacial acetic acid is distilled off first at a raised temperature and finally in a vacuum.

The crude acetylchloride is freed from small quantities of hydrogen chloride and glacial acetic acid by rectification. The yield of acetylchloride with regard to the glacial acetic acid entered into reaction, is almost quantitative. The glacial acetic acid which has not entered into reaction, about 5–10% of that used, is employed for the next operation. The white finely powdered residue left in the boiler, being a mixture of sodium pyrosulphate (1 mole) and sodium chloride (2 moles) is stirred out of the vessel through an opening provided at its bottom. It is made up into neutral sulphate.

The process may also be carried out in a continuous manner.

2. 277 parts of sodium chlorosulphonate (2 moles) intimately mixed with about 111–222 parts by weight of sodiumpyrosulphate $Na_2S_2O_7$ (½–1 mole) are treated according to Example 1 with 60 parts of glacial acetic acid (1 mole) while continually stirring. The residue, which, after having distilled off the acetylchloride, is freed from glacial acetic acid, consists of sodium pyrosulphate. A part thereof, about ⅓–½, is again added to the sodium chlorosulphonate of the next operation and thus remains as a diluent in the cycle of the process. The rest, so far as there is no direct use for the sodium pyrosulphate, is made up into sodium bisulphate.

3. In a stirring vessel provided with a fractionating column are mixed and stirred 117 parts by weight of dry common salt (2 moles) with 382 parts of melted, entirely dry p-toluene-sulphochloride (2 moles) and there are added slowly within some hours at 120–125° C., while continually stirring, 60 parts by weight of glacial acetic acid (1 mole). Acetylchloride and hydrogen chloride, which escape together at about 30–40° C. (thermometer in the column) are separated and collected as described in Example 1. From the residue, the rest of the glacial acetic acid is distilled off first by heating to over 130° C. and finally in a vacuum. The residue in the boiler is stirred in the cold. It then forms a grey powder consisting of a mixture of p-toluene-sulphonic acid anhydride and common salt and can be separated by water. The anhydride—with or without addition of common salt—is made up to sodium p-toluenesulphonate. The yield of acetylchloride is almost quantitative.

The required absolutely dry p-toluenesulphochloride is prepared by melting the moist technical product and freeing it from the separated water. The dry melt of p-toluene-sulphochloride may be filtered through glass-wool, asbestos, woolen or cotton filters and even through filter paper.

Instead of the molten p-toluenesulphochloride, benzenesulphochloride which is liquid at ordinary temperature, can be used with a similar result.

4. 60 parts by weight of glacial acetic acid (1 mole) are heated to boiling while stirring with 58.5 parts of dry common salt (1 mole). Into this composition 191 parts of dry melted p-toluenesulphochloride (1 mole) or the equivalent quantity of benzenesulphochloride are slowly run and there is then distilled through a column first the acetylchloride (with the hydrogen chloride) and afterwards the glacial acetic acid, the distillates being collected in separate receivers. Repeated fractionation of the distillates recovers half of the glacial acetic acid used, whereas the other half is almost quantitatively transformed into acetylchloride and obtained as such.

5. In Examples 1–4 the sodium salts may be replaced with equal results by the equivalent quantity of potassium salts. If the equivalent quantity of molten chloroacetic acid, propionic acid or butyric acid is substituted for the glacial acetic acid, chloroacetylchloride, propionylchloride or butyrylchloride are obtained in an analogous manner when operating at a somewhat elevated temperature.

Claims:

1. In a process for preparing carboxylic acid chlorides by reacting free carboxylic acids with a sulfochloride body, the step which consists in adding an inorganic salt as a solid extender to the reaction mixture.

2. In a process for preparing carboxylic acid chlorides by reacting free carboxylic acids with a sulfochloride body, the step which consists in adding an alkali metal chloride as solid extender to the reaction mixture.

3. A process of preparing acetylchloride which comprises reacting upon acetic acid with a sulfochloride body in the presence of sodium chloride.

4. The process of preparing carboxylic acid chlorides from free carboxylic acids with the aid of a sulfochloride body, which consists in causing at least two moles of the sulfochloride body to act upon one mole of a free carboxylic acid in the presence of an inorganic salt as a solid extender to the reaction mixture.

5. In the process of preparing carboxylic acid chlorides from free carboxylic acids with the aid of a sulfochloride body, which consists in causing at least two moles of the sulfochloride body to act upon one mole of a free carboxylic acid, the step which consists in adding to the reaction mixture an alkali metal chloride as an extending agent and an agent for promoting the reaction.

6. In the process of preparing carboxylic acid chlorides from free carboxylic acids with the aid of a sulfochloride body, which consists in causing at least two moles of the sulfochloride body to act upon one mole of a free carboxylic acid, the step which consists in adding to the reaction mixture sodium-chloride as an extending agent and an agent for promoting the reaction.

In testimony whereof, I affix my signature.

Dr. FRANZ HENLE.